United States Patent [19]

Losack

[11] Patent Number: 5,368,411

[45] Date of Patent: Nov. 29, 1994

[54] METHOD AND APPARATUS FOR ON THE SITE CLEANING OF CONTAMINATED SOIL

[75] Inventor: Billy J. Losack, Hondo, Tex.

[73] Assignee: Tuboscope Vetco International, Inc., Houston, Tex.

[21] Appl. No.: 934,358

[22] Filed: Aug. 20, 1992

[51] Int. Cl.$^5$ .............................. B08B 3/08; B08B 7/00
[52] U.S. Cl. ................................. 405/128; 405/258; 134/40; 210/610; 210/759; 210/922
[58] Field of Search ............... 405/128, 129, 258; 134/10, 22.19, 25.1, 26, 40, 42; 210/610, 747, 759, 922, 925; 435/262.5, 281

[56] References Cited

U.S. PATENT DOCUMENTS

| | | | |
|---|---|---|---|
| 4,342,657 | 8/1982 | Blair | 252/8.554 |
| 4,424,081 | 1/1984 | Giguere | 134/10 |
| 4,507,155 | 3/1985 | Cheek | 134/6 |
| 4,574,013 | 3/1987 | Peterson | 134/2 |
| 4,662,948 | 5/1987 | Weitzman | 134/25.1 |
| 4,906,302 | 3/1990 | Bruya | 134/10 |
| 4,932,892 | 7/1983 | Wagner et al. | 134/25.1 |
| 4,978,508 | 12/1990 | Hansen et al. | 422/186.08 |
| 4,993,873 | 2/1991 | Tippmer | 405/128 |
| 5,205,927 | 4/1993 | Wickramanayake | 210/170 |
| 5,221,159 | 6/1993 | Billings et al. | 405/128 |
| 5,228,921 | 7/1993 | Peterson | 134/25.1 |

FOREIGN PATENT DOCUMENTS

| | | |
|---|---|---|
| 2531732 | 2/1977 | Germany . |
| 2724271 | 12/1978 | Germany . |
| 3216771 | 12/1982 | Germany . |
| 3447079 | 3/1986 | Germany . |

Primary Examiner—Randolph A. Reese
Assistant Examiner—John Ricci
Attorney, Agent, or Firm—Finnegan, Henderson, Farabow, Garrett & Dunner

[57] ABSTRACT

An in situ method of cleaning contaminated soil and/or water comprises breaking up contaminated soil, admixing soil with water and a biodegradable detergent in a proportion effective to obtain an aqueous slurry where the contaminant and the detergent interact, allowing the slurry to stand under conditions effective to permit any contaminant-detergent formations to rise in the aqueous slurry, separating the contaminant-detergent formations from the aqueous slurry, now comprising partially decontaminated soil and water, separating the soil from the water, repeating the cleaning and separation steps until the soil has less contaminant than a predetermined value, typically a 80 to 90 percent decrease, admixing the low contamination-soil with water and an activating agent for contaminant-degrading microorganism, the agent being capable of generating hydrogen peroxide ($H_2O_2$) in solution, allowing the activating agent to interact with soil microorganisms in the aqueous mixture under conditions effective to degrade any contaminants remaining therein, separating the activating agent-treated soil from the aqueous mixture comprising the microorganisms, washing the separated soil and returning it to the original environment site, filtering the previously separated water to separate any contaminants, and recycling the filtered water into the system or returning it to the environment. An apparatus for performing the process is also disclosed.

16 Claims, 2 Drawing Sheets

METHOD AND APPARATUS FOR ON THE SITE CLEANING OF CONTAMINATED SOIL

BACKGROUND OF THE INVENTION

1. Field of the Invention

This invention relates to an in situ method of cleaning soil, particularly sand, and aqueous solutions such as water, that have been contaminated by, e.g., a spill of oil, chlorinated hydrocarbons, organic solvents, polychlorinated biphenyls (PCBs), and the like. The method relies on the formation of an aqueous slurry, the addition in separate steps of a detergent as well as a microorganism and an additive, and the regulation of temperature to reduce the presence of oil or other contaminants in the soil and/or water. The extraction of oil and/or other contaminants with the detergent may be repeated until their content is reduced to a point at which the soil and/or water are allowed to be degraded by indigenous microorganisms. This patent provides a method of cleaning contaminated soil and water, and an apparatus for so doing.

2. Description of the Background

Various methods have been employed in the past to remove contaminants from contaminated solids such as soil. U.S. Pat. No. 4,392,892 to Wagner et al discloses a method that impregnates soil, sand or residues that contain oil or petroleum hydrocarbons with an aqueous solution containing microbially-produced glycolipids. The resulting oil phase or emulsion leaves the capillaries of the oil-contaminating material, rises out of the aqueous phase, and is separated therefrom.

U.S. Pat. No. 4,424,081 to Giguere discloses a method for reconditioning soils contaminated with heavy crude, refined petroleum, and/or chemical products derived from similar sources. The method comprises mixing the soil with water, sodium hydroxide and steam to provide a blended slurry. The blended slurry is further agitated and heated in a sparger kiln to approximately 210° F. (99° C.) at the kiln outlet to provide a fine particle slurry. A caustic liquid is also injected at the kiln inlet to facilitate the extraction of the contaminants from the slurry. The separation of oil particles from the fine particle slurry is accomplished by first washing the slurry in a clarifier, followed by washing in flotation cell units, and subjecting the slurry to an aeration clarifier. A fatty acid or alcohol reagent is added at the aeration stage which produces a foam to which the oil particles adhere.

U.S. Pat. No. 4,574,013 to Peterson discloses a method for decontaminating soil containing halogenated contaminants by reaction schemes that are carried out in a slurry of soil and a non-aqueous reagent mixture. The non-aqueous reagent mixture of the Peterson patent contains an alkaline component and a sulfoxide catalyst. There are four possibilities suggested for the alkaline component: an alkali metal hydroxide, an alkali metal hydroxide/alcohol mixture, an alkali metal hydroxide/glycol mixture, and an alkoxide. The Peterson process employs a non-aqueous reagent mixture and, therefore, when wet soil is to be decontaminated, vacuum must first be applied to remove any water prior to contacting the soil with the non-aqueous reagent mixture.

U.S. Pat. No. 4,662,948 to Weitzman discloses a method for removing polychlorinated biphenyls (PCBs) and chlorinated dioxins from solids, particularly soil. The Weitzman method removes contaminants by contacting the solids with a non-aqueous liquid containing a halogenated hydrocarbon. A smaller amount of polar organic solvent, e.g., methanol, is preferably used. The polar organic solvent apparently improves the wettability of the contaminated solids and allows the halogenated hydrocarbon to more easily extract PCBs and dioxins.

A study published by the U.S. Department of Commerce (National Technical Information Service No. PB84-123637) funded by the United States Environmental Protection Agency and conducted by Rexnord, Inc. discusses requirements for mobile systems to extract spilled hazardous materials from excavated soils. The study lists the characteristics necessary for an effective extraction fluid. Chief among these characteristics is a solvent possessing low volatility at ambient conditions. A volatile solvent under ambient conditions, such as aqueous ammonia, is not considered a suitable extraction fluid by the above study to decontaminate soil.

Aqueous ammonia has previously been used as a solvent for cleaning mechanical devices. For example, U.S. Pat. No. 4,507,155 to Cheek discloses a cleaning composition that includes a chlorinated hydrocarbon liquid, a petroleum distillate, an aliphatic alcohol, and aqueous ammonia. The composition has two phases which must be shaken before application. The concentration of ammonia in the composition is kept low, e.g., 20–33% maximum, to prevent burns to the handler. The composition is disclosed as being suitable for removing dried printing ink from printing equipment such as printing rollers as well as for removing stains from textiles.

U.S. Pat. No. 4,906,302 to Bruya discloses a method for decontaminating solid materials by removing hazardous organic waste with aqueous ammonia. The resulting solution is then treated to recover the organic waste for disposal and the decontaminated soil is returned to the excavation site.

German OS No. 3,216,771 discloses a process for cleaning earth contaminated with toxic materials. In this process, the earth is, e.g., heated in a rotating drum and the resulting gas products are burnt.

German Patent Application No. P3,447,079 also refers to a process for the thermal treatment of contaminated earth. In this process the earth is treated at a temperature of at least 600° C. and the resulting gas is also burnt. In the processes of the two German references described above, the gas contaminants are thermally removed from the earth at relatively high temperatures. This requires a relatively large amount of energy.

German OS No. 2,531,732 describes a process for the removal, treatment and regeneration of oil-contaminated soil. Oil and water-soluble noxious components are washed out in low surface tension water preferably a temperatures between 60° and 90° C. The material to be treated is comminuted and mixed with the cleaning medium in a spiral drum and then separated from the contaminant-binding cleaning medium by sedimentation in a clearing sump.

A similar process for the regeneration of soil, e.g., soil contaminated by oil, is shown in German OS No. 2,724,271. Contaminated soil is optionally comminuted, suspended in the form of a slurry in a liquid such as water, and then heated to a vaporizing temperature in a continuous flow chamber. The upper layer of the suspension is stripped off and separated in the chamber.

The dissolved substances, however, are not washed out from the contaminated soil in such a process at the vaporization temperature of water.

U.S. Pat. No. 4,993,873 to Tippmer discloses a further method for extracting substances such as benzene, toluene, phenols and heterocyclic hydrocarbons from soil by suspending the soil in water and subjecting the thus formed slurry to a multi-stage water extraction at high temperature, and drying the extracted soil.

Accordingly, there is still a need of a simple and effective method and apparatus for cleaning oil-contaminated soil, particularly sand and water, that can be conducted at the site of an oil spill and provide a significant reduction in the oil content of the soil and the surface and subterranean water layers.

SUMMARY OF THE INVENTION

This invention relates to an in situ method of cleaning contaminated soil and/or water, comprising
(a) breaking up contaminated soil;
(b) admixing the soil with water and a biodegradable detergent in a proportion effective to obtain an aqueous slurry where the contaminant and the detergent interact;
(c) allowing the slurry to stand under conditions effective to permit any contaminant-detergent formations to rise in the aqueous slurry;
(d) separating the contaminant-detergent formations from the aqueous slurry which now comprises partially decontaminated soil and water;
(e) separating the partially decontaminated soil from the water phase;
(f) repeating steps (b) through (e) until the soil has a content of contaminant lower than a predetermined value;
(g) admixing the low contaminant soil with water and an activating agent for contaminant-degrading, soil-indigenous microorganisms, the activating agent being capable of generating $H_2O_2$ in solution;
(h) allowing the microorganisms to interact with the aqueous mixture comprising the activating agent under conditions effective to substantially degrade contaminant remaining therein;
(i) separating the activating agent-treated soil from the aqueous mixture comprising the activating agent;
(j) washing the separated soil and returning it to the environment;
(k) filtering the water separated in step (e); and
(l) recycling the filtered water into step (b) or step (g) or returning it to the environment.

This invention also relates to an apparatus for in situ cleaning contaminated soil and water, comprising
first container provided with first means for inputting soil, first means for outputting soil, first means for inputting water, first means for outputting water, first means for outputting contaminant-detergent formations, first means of mixing and moving the soil from the first soil input means to the first soil output means, first heating means, first skimming means, and first means for separating water from soil;
second container provided with second means for inputting soil, second means for outputting soil, second means for inputting water, second means for outputting water, second means for outputting contaminant-detergent formations, second means of mixing and moving the soil from the second soil inputting means to the second soil outputting means, second heating means, second skimming means, and second means for separating water from soil;
third container provided with third means for inputting soil, third means for inputting water, and means for inputting a microorganism activating agent, third means for outputting soil, third means for outputting water, third means of mixing and moving soil from the third soil input means to the third soil output means, third heating means and third means for separating water from soil;
means for connecting the first soil output means with the second soil input means, the connecting means being provided with a fifth means of mixing and moving the soil from the first soil output means to the second soil input means;
means for connecting the second soil output means with the third soil input means, the connecting means provided with a sixth means of mixing and moving soil from the second soil output means to the third soil input means;
means for connecting the second water output means with the situs of the contaminated water;
means for returning substantially contaminant free soil to the situs, the soil returning means being connected to the third soil output means;
at least one means for separation of contaminant from water provided with water input and output means;
at least one means for filtering water provided with water input and output means;
means for connecting the output means of the at least one water/contaminant separating means with the input means of the at least one filtering means;
means for connecting the water output means of the first, second and third containers with the input means of the water/contaminant separating means;
means for connecting the output means of the at least one water filtering means with the water input means of the first, second and third containers for recirculating water;
means for circulating the water through the water connecting means, the at least one water/contaminant separating means, the at least one water filtering means and first, second and third containers; and
means for operating the circulating means, the heating means and the mixing and moving means.

A more complete appreciation of the invention and many of the attendant advantages thereof will be readily perceived as the same becomes better understood by reference to the following detailed description when considered in connection with the following drawings.

Other objects, advantages and features of the present invention will become apparent to those skilled in the art from the following discussion.

DESCRIPTION OF THE PREFERRED EMBODIMENTS WITH REFERENCE TO THE DRAWINGS

This invention arose from a desire by the inventor to provide a method for cleaning spills of oil, halogenated hydrocarbons such as PCBs, organic solvents, and the like, and provide a means for decontamination and bioremediation of soil, particularly sandy soil, and water, for other uses.

The soil and water cleaning and bioremediation system of this invention provides a cost-effective, rapid and environmentally sound method for treating soil contaminated with many types of petroleum, halogenated hydrocarbons, such as PCBs, polyalkyleneglycols and other oxygenated contaminants, cyanide and derivatives thereof, sulfur-containing compounds and derivatives thereof, and organic solvents, among others. After individually tailored testing and completion of decontamination of numerous soil cleaning projects, the present methodology has proven to lower the level of contaminants in soil and water to acceptable levels in a matter of days. Yet, the present cleaning and bioremediation system is far less costly than other methods of soil clean-up and lacks the liability associated with landfilling.

The method of this invention offers the following advantages, among others, when compared to other soil treatment methods.

(a) Significant cost savings over thermal treatments or off-site landfilling.
(b) Slurry mixing ensures that all contaminated soil particles are exposed to bacteria.
(c) No foreign microbes are required but may be added.
(d) Elimination of liability associated with landfilling.
(e) Curing time is often shorter than other biological treatment processes.

The soil and water cleaning process of this invention is based on soil washing and bioremediation. The process employs a soil contaminant-degrading microorganism activating agent capable of providing $H_2O_2$, or generating this compound, in solution. The activating agent comprises $H_2O_2$, organic peroxides that aid in the breakdown of the contaminants, and optionally substances that are essential for microorganism metabolism, biological catalysts, soil conditioners and natural compounds to assist in the breakdown of contaminants. Examples of preparations suitable for use as the additive are solutions of $H_2O_2$, organic peroxides, humic acid with a fertilizer comprising nitrogen, phosphorus and potash, and the like. Suitably, the additive may be provided in solution. The solution may contain a broad concentration of the additive, e.g., about 10 to 70%, and more preferably about 20 to 45% thereof. The activating agent stimulates the indigenous soil microecology, including aerobic and anaerobic bacteria, spores, and other microbes. This treatment enhances the activities of microorganisms present in the soil and increases the effectiveness of the remediation process, broadening its effectiveness. No superbugs or bacteria foreign to the site are required, although in especially difficult applications they may be added, if desired.

In a preferred embodiment of the invention, the process is performed in a continuous mode. In another preferred embodiment, the process is performed in a dual reactor mobile unit such as a trailer. The mobile unit is self-contained and fully equipped to begin soil treatment upon arrival at the site. Any soil lumps are broken up to a desired size.

The soil may be reduced to a particle size of less than about 1 inch utilizing standard means. Suitable means for breaking up soil are grinders, strippers, tillers, hoes, disks or blades. The break up of the soil may be attained prior to loading the soil in the apparatus or a means for breaking up soil incorporated therein.

The soil may then be loaded into a first container and water and a surfactant or detergent are added to obtain a slurry.

Contaminated ground water from the site may be used as well as substantially pure water. Within a few minutes of mixing, the surfactant or detergent interacts with the contaminant(s) to form aggregates, and the aggregates are separated from the soil as they move up to the top layer of the slurry. The detergent-contaminant aggregates, in the form of a suspension may be separated from the slurry and sent to a filtration unit to separate them from the water. The remaining water is then separated in the container from the partially decontaminated soil, passed through a filter such as a bioactivated carbon scrubber, ionic resin, gravel, or combination thereof, optionally with the aid of a filter plate with alternate substantially linear openings of perpendicular orientation, and returned to the container. This filter plate is described in a co-filed, co-pending application by the present inventor entitled "Filter Plate for Removing Hydrocarbons and Other Contaminants from Aqueous Solutions and Gases".

The first step is fast and may be completed in less than one hour, and may attain more than 70 to 80% contaminant reduction. The remaining soil may then be transferred to a second container where detergent or surfactant and water are added once again in similar proportions. A further reduction of the level of contaminants is attained herein. In a particularly preferred embodiment, the first and the second containers are one and the same. After two or more of these steps, a decontamination in excess of 80% may be obtained, and in many instances up to 90% and greater. Once the soil exits the repeated detergent treatments, it may be transferred to a third container, and a microorganism activating agent and water added to form a slurry. The slurry may then be mixed, and air provided, e.g., under slight pressure, to aid the metabolism of the aerobic microorganisms. The fumes produced in the containers may be recirculated through a filter(s) such as carbon filters and the like, and then returned to the container(s). The slurry may then be allowed to stand, optionally with mixing, in the third reactor for a period of time effective to allow a substantial breakdown of the soil and for the microorganisms to multiply until a ratio of, e.g., up to one bacteria to one soil particle is attained. This one-to-one ratio established superior conditions for the total consumption of the contaminants. Other ratios, however, may be satisfactorily utilized as well.

The slurry may then be discharged to the site, or it may be placed on a lined curing bed and covered with, e.g., plastic, to allow for further action by microorganisms as described in a co-pending application by the present inventor. The cover is intended to hold in moisture and to maintain a more or less constant temperature. The time needed for the soil and the activating agent in the curing bed depends upon the type and level of contaminant(s).

The method described herein has been shown to achieve over 80% contaminant reduction, and in some cases up to about 90% contaminant reduction, within minutes, with the detergent alone. When the additive, water and/or oxygen, are added, over 99% contaminant reduction can be achieved within 1 ½months, and sometimes higher decontamination ratios such as a contaminant reduction to 0.01% of the original content. The present method may reduce the presence of polychlorinated biphenyls and perchloroethylene contaminants in water to an undetectable level. The amount of cyanide contaminant in soil may be reduced to undetectable levels. The presence of contaminants are tested by the EPA 8240 and EPA 6240 methods.

This invention, thus, provides an in situ method of cleaning contaminated soil and water, comprising
 (a) breaking up contaminated soil;
 (b) admixing the soil with water and a biodegradable detergent in a proportion effective to obtain an aqueous slurry where the soil, any contaminant and the detergent interact;
 (c) allowing the slurry to stand under conditions effective to permit any contaminant-detergent formations to rise in the aqueous slurry;
 (d) separating the contaminant-detergent formations from the aqueous slurry which now comprises partially decontaminated soil and water;
 (e) separating the partially decontaminated soil from the water phase;
 (f) repeating steps (b) through (e) until the soil has a content of contaminant lower than a predetermined value;
 (g) admixing the low contaminant content soil with water and an activating agent for contaminant-degrading soil-indigenous microorganisms, the agent being capable of generating $H_2O_2$ in solution;
 (h) allowing the microorganisms to interact with the aqueous mixture comprising the microorganism activating agent under conditions effective to substantially degrade any contaminant remaining therein;
 (i) separating the activating agent-treated soil from the aqueous mixture comprising the activating agent;
 (j) washing the separated soil and returning it to the environment;
 (k) filtering the contaminated water separated in step (e); and
 (l) recycling the filtered water into step (b) or step (g), or returning it to the environment.

Figure 2:
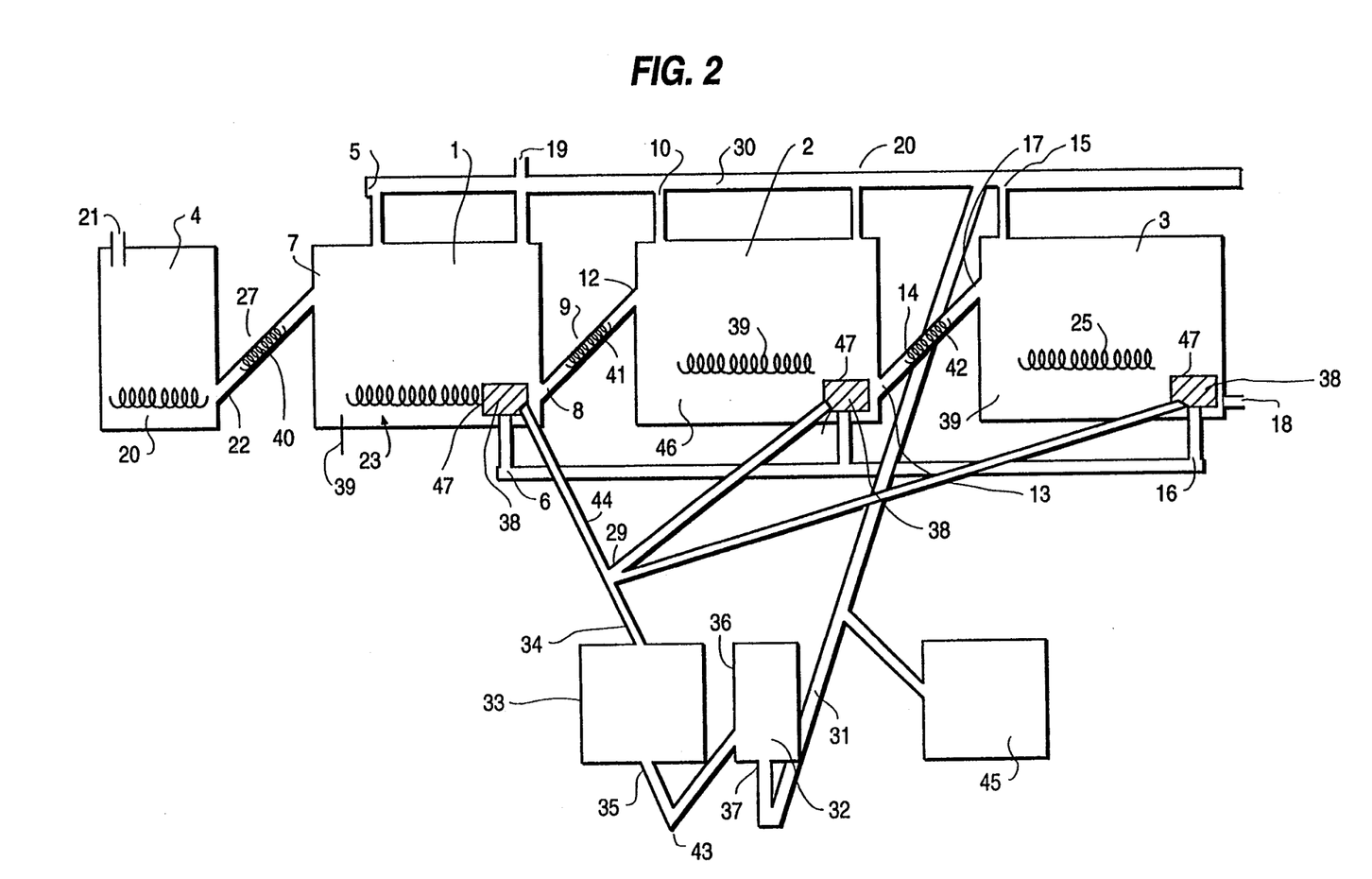
FIG. 2 shows a schematic of the mobile embodiment of an apparatus in accordance with this invention.

In a portable embodiment of the invention, the mobile unit is positioned next to the contaminated areas and the contaminated soil is transported to and introduced into a soil breaking container (4) through its input means (2), e.g., by means of a hopper (not shown). The soil is broken up in the container (4) by means of cutting blades or other breaking means (26) known in the art. The broken up soil exits the breaking container (4) through its output means (22) and is transported by a connecting means (27) into a first container (1) through its input means (7). Once the soil is broken up at the site of contamination, it may then be loaded into the first container (1). Once water and a biodegradable detergent or surfactant are introduced via a water input means (5), the three components are admixed under conditions effective for the formation of an aqueous slurry. This step may be allowed to proceed for a period of about 15 to 120 minutes, and more preferably about 30 to 60 minutes. The period of time selected will depend on the degree of contamination of the soil and the type of contaminant(s). Ultimately, the contaminant(s) and the detergent or surfactant will interact to form aggregates or conglomerants. These contaminant-detergent formations will eventually rise to the surface of the aqueous slurry and may be, e.g., taken out via a pump (19) of the first container or separated from the surface of the aqueous phase by skimming.

The detergent of this invention is preferably biodegradable and non-toxic to endogenous soil microorganisms or to any contaminant-degrading microorganisms added in the process. Accordingly, the detergent of this invention does not inhibit microorganisms or their effectiveness in subsequent bioremediation steps. A biodegradable and non-toxic detergent, as the one used herein, will not persist in the rehabilitated soil, and will therefore not alter the population of soil organisms thereafter. As a result, rehabilitated soil will contain few by-products of the remediation process.

The present detergent may, in general, be natural or synthetic, and preferably comprises fatty acids, and may contain additives such as those utilized in fertilizers and humic acid. For example, additives such as phosphorous- and nitrogen-containing agents are suitable as is potash. The detergent utilized herein acts as a surfactant to separate portions of the soil from the contaminants associated therewith. Suitable detergents for use herein are mild soaps. Many are commercially available products, however, not of the household laundering type. Suitable detergents for use herein are largely free of ammonia, ammonia producing compounds, compounds containing halogens such as chlorine, anti-microbial agents, disinfectants, other bleaches, alkaline agents and strong acids. The detergents of this invention preferably yield a pH range of about 6 to 8 in aqueous solution. A pH greater than about 8 may be too basic for the microorganisms to survive in the soil. The microorganisms may overeat the detergent and die. A pH lower than about 6 may be too acidic and kill the microorganisms. A preferred pH is about 6.5 to 7.5. These products are also preferably added as an aqueous solution of specific gravity about 1.5 to 2.5, and more preferably about 1.5 to 1.9. Examples of suitable detergents are manufactured by Calgon and Procter and Gamble as well as Omniclean ® and a line of detergents sold by Medina Agriculture Products Co., Inc (Hondo, Tex.). Other types of detergents or surfactants may be utilized as long as they do not contain lye as do many laundry detergents. However, any biodegradable detergent or surfactant which will interact with soil contaminant(s) such as oil, halogenated hydrocarbons, solvents and the like, may be utilized.

The surfactant is provided for use herein preferably in solution, in an amount of about 10 to 90% in water or other biocompatible aqueous solution, and more preferably about 20 to 70%. The water added to the formation of the first slurry may be substantially decontaminated water or water obtained from a contaminated site, which was obtained from a surface or subsurface formation.

The proportion of detergent:soil:water is preferably about 0.1:6:100 to 10:10:10,000 gallons:yds$^3$:gallons, and more preferably about 0.8:7:500 to 2.5:9:5,000 gallons:yds$^3$:gallons.

The final concentration of detergent will vary depending on the concentration of contaminants, type and variety of contaminant, and soil characteristics.

The surfactant is provided for use herein preferably in solution, in an amount of about 10 to 90% in water or other biocompatible aqueous solution, and more preferably about 20 to 70%.

The water added to the formation of the first slurry may be substantially decontaminated water or water obtained from a contaminated site, which was obtained from a surface or subsurface formation.

The proportion of detergent:soil:water is preferably about 0.1:6:100 to 10:10:10,000 gallons:yds$^3$:gallons, and more preferably about 0.8:7:500 to 2.5:9:5,000 gallons:yds$^3$:gallons.

The soil may be separated from the water by filtering means (38) such as filters and/or screens.

In a particular aspect of the invention, the removal of contaminant-detergent formations may be undertaken by froth flotation or other means of skimming or separating the formations from the slurry. The contaminant-detergent formations may be pumped out of the first container for subsequent treatment and/or biodegradation.

After the contaminant-detergent formations are removed, the partially decontaminated soil is separated from the water by means such as a filter or a screen, or other means known in the art.

The degree of contamination of the soil and water is at this point considerably decreased, in some instances up to and over about 90%, and on occasion up to about 95% and more. The above steps may be repeated to further lower the level of contamination in the soil and water. However, costwise it is advisable to continue onto the following steps after an 80 and 90% decontamination level is achieved. The second time the detergent or surfactant is added, the proportion of detergent or surfactant needed will be substantially lower when compared to the first one. In general, the ratio of detergent to water and soil remains within the same range.

The temperature for containers 1 and 2 may be maintained at about 30° to 212° F., and more preferably about 40° to 120° F. These steps may be accompanied by mixing and/or shearing.

When the degree of contamination has been reduced to a desired level, e.g., less than about 20%, and more preferably to less than about 10%, then soil and water may be admixed with an activating agent for soil-indigenous, contaminant-degrading microorganisms that are contained in the soil and/or water. The agent may, for example, comprise hydrogen peroxide, organic peroxides, and any material capable of generating $H_2O_2$ in solution such as humic acid and, e.g., a fertilizer comprising nitrogen, phosphorus and potash.

The activating agent may be added to the slurry preferably in proportion of about 0.1 to 10 gallons of activating agent per about 100 to 10,000 gallons of water and about 6 to 10 yds$^3$ of soil.

A source of oxygen, such as air, may be added to the soil and water mixture along with the activating agent. The microorganisms are allowed to interact with the aqueous mixture comprising the activating agent under conditions effective to substantially degrade any contaminant remaining therein. Suitable conditions are temperatures of about 15° to 130° C., and more preferably about 30° to 42° C. and about 60° to 100° C., regulated by a heating means (39). This step may be accompanied by mixing in order to allow the oxygen to penetrate into the inner portions of the slurry. This permits the aerobic bacteria from the soil and/or water to become active in the degradation of contaminants.

After a period of time of about 21 days, and more preferably about 180 days, the activating agent-treated soil is separated from the aqueous mixture by means known in the art and described above, such as by screening or filtering. The soil exiting through the soil output means (18) may then be washed and returned to its natural habitat.

The water separated from the decontaminated soil coming out of the water output means (6) may be filtered through a filtering means (32) after passing through a water/contaminant separating means (33), e.g., with carbon filters alone or in combination with other technology, and recycled for further processing of contaminated soil or returned to its natural habitat.

The filtration of the contaminated water may be conducted with at least one filter means (32) selected from the group consisting of a plate provided with T-shaped openings, charcoal or other carbon filters, gravel, ion-exchange resin(s), and combinations thereof. In a preferred embodiment, the filtration is conducted at least twice with a filter comprising T-shaped openings prior to recycling the filtered water. In another preferred embodiment, activated carbon is used and more preferably a cascade of at least three filters with activated carbon is utilized. In another preferred embodiment a cascade of three charcoal or activated carbon filters and at least one and up to three ion-exchange resin filters are used.

In another preferred embodiment, when the slurry is allowed to stand under conditions effective for the formation of contaminant-detergent aggregates and water and soil are allowed to stand in the presence of the activating agent so that the microorganisms may biodegrade the contaminants remaining therein, these steps are conducted with agitation and shearing.

A variety of soils may be treated by the present method, such as sandy soils, particularly sand itself, clay and other types of soils such as gravel, limestone, tundra and glacierous sands and clays, humus and the like.

In a preferred embodiment of the method, microorganisms may be added for the degradation of the contaminant(s). The types of microorganisms that may be added are, e.g., bacteria selected from the group consisting of hydrocarbon degrading microorganisms, paraffin-degrading microorganisms, halogenated organic compounds degrading microorganisms, grease degrading microorganisms, and mixtures thereof, among others. In another embodiment, the bacteria may be selected from thermophilic hydrocarbon-degrading bacteria and halogenated hydrocarbon-degrading bacteria. Examples of these are known in the art and need not be further described herein.

This invention also provides an apparatus for in situ cleaning contaminated soil and water, comprising soil breaking container (4) provided with soil input (21) and output (22) means and means for breaking up soil (26);

first container (1) provided with first means for inputting soil (7), first means for outputting soil (8), first means for inputting water (5), first means for outputting water (6), first means for outputting contaminant-detergent formations (19), first means of mixing and moving the soil from the first soil input means to the first soil output means (23), first heating means (39), first skimming means (47), and first means for separating water from soil (38);

second container (2) provided with second means for inputting soil (12), second means for outputting soil (13), second means for inputting water (10), second means for outputting water (1 I ), second means for outputting contaminant-detergent formations (20), second means of mixing and moving the soil from the second soil inputting means to the second soil outputting means (50), second heating means (46), second skimming means(47), and second means for separating water from soil (38);

third container (3) provided with third means for inputting soil (17), third means for inputting water (15), and means for inputting a microorganism activating agent, third means for outputting soil (18), third means for outputting water (16), third means of mixing and moving soil from the third soil input means to the third soil output means (25), third heating means (39), third skimming means (47), and third means for separating water from soil (38);

means for connecting the output means of the soil breaking container with the first soil input means (27), the breaking container connecting means being provided with a fourth means of moving soil from the breaking container output means to the first soil input means (40);

means for connecting the first soil output means with the second soil input means (9), the connecting means being provided with a fifth means of mixing and moving the soil from the first soil output means to the second soil input means (41);

means for connecting the second soil output means with the third soil input means (14), the connecting means provided with a sixth means of mixing and moving soil from the second soil output means to the third soil input means (42);

means for connecting the third water output means (16) with the site of the contaminated water; means for returning substantially contaminant free soil to the situs, the soil returning means being connected to the third soil output means (18);

at least one means for separating water from contaminants (33) provided with water input (34) and output (35) means;

at least one means for filtering water (32) provided with water input (36) and output (37) means;

means for connecting (43) the output means (35) of the at least one water/contaminant separation means (33) with the input means (36) of the at least one filtering means (32);

means for connecting (44) the water output means of the first (6), second (11) and third (16) containers with the input means (34) of the water/contaminant separation means (33);

means for connecting (31) the output means (37) of the at least one water filtering means (32) with the water input means of the first (5), second (10) and third (15) containers for recirculating water;

means for circulating (45) the water through the water connecting means, the at least one water/contaminant separation means, the at least one water filtering means and first, second and third containers; and means for operating (46) the circulating means (45), the heating means (39) and the mixing and moving means (23; 39; 25; 41; 42; 40).

In one particularly preferred embodiment of the apparatus of this invention, the at least one filtering means (32) comprises first, second and third series of filtering means;

the first series of filtering means being provided with water input and output means (36) and a first water/contaminants separation means (e.g., $A.P.I._1$) (33), the first water/contaminants separation means (33) being provided with water input (34) and output (35) means and connected to the input means (36) of a first filtering means of the first series of filtering means, the output means (37) of each of the filtering means of the first series being connected to the input means (36) of the subsequent filtering means of the series and the output means (37) of the last filtering means of the series being connected to the means for connecting the water output means (31) of the filtering means to the first, second and third containers;

the second series of filtering means being provided with water input and output means and a second water/contaminants separation means ($A.P.I._2$), the second water/contaminants separation means being provided with water input and output means and connected to the input means of a first filtering means of the second series of filtering means, the output means of each of the filtering means of the second series being connected to the input means of the subsequent filtering means of the series and the output means of the last filtering means of the series being connected to the means for connecting the water output means of the filtering means to the first, second and third containers; and the third series of filtering means being provided with water input and output means and a third water/contaminants separation means ($A.P.I._3$), the third water/contaminants separation means being provided with water input and output means and connected to the input means of a first filtering means of the third series of filtering means, the output means of each of the filtering means of the third series being connected to the input means of the subsequent filtering means of the series and the output means of the last filtering means of the series being connected to the means for connecting the water output means of the filtering means to the first, second and third containers.

In another particularly preferred embodiment, each of the first and second skimming means comprises froth flotation means. In still another embodiment, each of the first, second and third soil and water separation means (38) comprises a sieve or grate means of an apperture effective for allowing the water to pass through while retaining the soil. Examples of the appertures are screens of about $\frac{1}{8}$ to 1 inch apperture, and more preferably about $\frac{1}{4}$ to $\frac{1}{2}$ inch, as determined by the characteristics of the transfer pump utilized.

The present apparatus is particularly suited for application to the clean up of spills in a soil such as sand.

In one aspect of the invention, the sole breaking means (4) is part of the first container (1), and is optionally regulatable so as to be capable of producing soil particles of a predetermined size.

In another embodiment, each of the water filter means (32) is selected from the group consisting of a plate provided with substantially linear openings of alternate perpendicular orientation capable of supporting a filtering material such as charcoal or other carbon materials, gravel, ion-exchange resins, and combinations thereof. In a still more preferred embodiment, a cascade of several filters, with supported filtering materials, is provided for purification of the water. These may be various plates provided with substantially linear openings or charcoal filters supporting one or more materials such as carbon, gravel or sand, or an, and/or ion-exchange resin connected in series.

In a particularly useful and mobile embodiment of the invention, the apparatus further comprises a platform mounted on wheels, all the components of the apparatus being secured thereupon. This mobile platform may be mobilized to the site where the soil contamination occurs by a means of mobilization or motor.

Having now generally described this invention, the same will be better understood by reference to certain specific examples, which are included herein for purposes of illustration only and are not intended to limiting of the invention or any embodiment thereof, unless so specified.

EXAMPLES

Example 1: Soil Contaminated by Oil

Various soils have been successfully treated with the process of the invention. Particularly, soils contaminated with a variety of petroleum and chlorinated hydrocarbons. In a West Texas project, heavy oil contaminated soil exhibited a total petroleum hydrocarbon (TPH) level of 66,000 ppm. This soil was excavated and processed by the present method for 30 minutes and then staged for curing.

The detergent utilized was Bio-S (Medina Agriculture Products Co., Inc., Hondo, Tex.), and it was added in a proportion of 1:4:500 (g:yd$^3$:g) to the soil and water. The activating agent used was a soil activator (Medina Agriculture Products Co., Inc., Hondo, Tex.), and it was used in a proportion to a Bio-D fertilizer (Medina Agriculture Products Co., Inc., Hondo, Tex.), and Hydrocarbon Degrading Bacteria (Medina Agriculture Products Co., Inc., Hondo, Tex.) of 1:½:¼ (quart-:pint:lbs).

Figure 1:
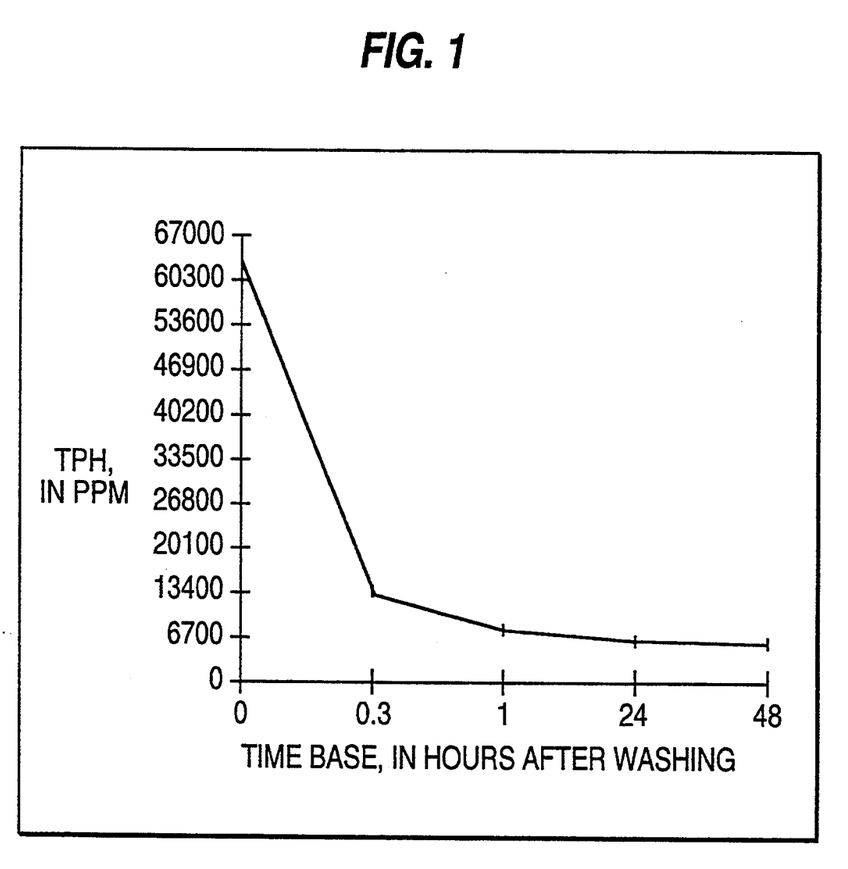
FIG. 1 shows a reduction of more than 90% of total petroleum hydrocarbons (TPH) in a West Texas contaminated soil treated by the method of the invention.

Within 48 hours the TPH level of the soil was reduced by 90% to approximately 6,700 ppm as shown in FIG. 1. Continued contaminant reduction to below laboratory limits was accomplished in less than a month.

The invention now being fully described will be apparent to one of ordinary skill in the art that many changes and modifications may be made thereto without departing from the spirit or scope of the invention as set forth herein.

What is claimed as novel in United States Letters Patent is:

1. An in situ method of cleaning contaminated soil comprising
   (a) breaking up contaminated soil;
   (b) admixing soil with water and a biodegradable detergent in a proportion effective to obtain an aqueous slurry where the soil and any contaminant and the detergent interact;
   (c) allowing the slurry to stand under conditions effective to permit any contaminant-detergent formations to rise in the aqueous slurry;
   (d) separating the contaminant-detergent formations from the aqueous slurry which now comprises partially decontaminated soil and water;
   (e) separating the partially decontaminated soil from the water phase;
   (f) repeating steps (b) through (e) until the soil has a content of contaminant lower than a predetermined value;
   (g) admixing the low contaminant soil with water and an activating agent for contaminant-degrading soil-indigenous microorganisms, the agent being capable of generating $H_2O_2$ in solution;
   (h) allowing the microorganisms to interact with the aqueous mixture comprising the microorganism activating agent under conditions effective to substantially degrade contaminant remaining therein;
   (i) separating the activating agent-treated soil from the aqueous mixture comprising the activating agent;
   (j) washing the separated soil and returning it to the environment;
   (k) filtering the contaminated water separated in step (3); and
   (l) recycling the filtered water into step (b) or (g) or returning it to the environment.

2. The method of claim 1, wherein
step (k) is conducted with a filter selected from the group consisting of a plate provided with T-shaped openings, charcoal, gravel ion-exchange resins, and combinations thereof.

3. The method of claim 2, wherein
step (k) is conducted at least twice with a filter comprising substantially linear openings of alternate perpendicular orientation supporting a filtering material is prior to step (1).

4. The method of claim 1, wherein
steps (c) and (h) are conducted with agitation and shearing.

5. The method of claim 1, wherein
step (b) is conducted at a temperature of about 30° to 212° F.; and step (c) is conducted at a temperature of about 30° F. to 212° F.

6. The method of claim 1, wherein
step (g) is conducted at a temperature of about 30° to 212° F; and step (h) is conducted at a temperature of about 30° to 212° F.

7. The method of claim 1, wherein
steps (b) and (g) are conducted with agitation and shearing.

8. The method of claim 1, wherein
steps (c) and (h) are conducted with agitation and shearing.

9. The method of claim 1, wherein
the soil comprises sand.

10. The method of claim 1, wherein
the biodegradable detergent is added in step (b) as a liquid solution or suspension of a mild fatty acid containing nitrogen, phosphorous and potash having a specific gravity of about 1.5 to 1.9, and a pH of about 6 to 8.

11. The method of claim 1, wherein
step (g) further comprises adding a microorganism selected from the group consisting of hydrocarbon degrading microorganisms, halogenated organic compound degrading microorganisms, thermophilic mutants thereof and mixtures thereof.

12. The method of claim 1, wherein
the activating agent added in step (g) comprises a composition comprising a compound selected from the group consisting of $H_2O_2$, organic peroxides, and humic acid, potash, and nitrogen- and phosphorus-containing compounds.

13. An apparatus for in situ cleaning contaminated soil and water comprising
first container provided with first means for inputting soil, first means for outputting soil, first means for inputting water, first means for outputting water, first means for outputting contaminant-detergent formations, first means of mixing and moving the soil from the first soil input means to the first soil output means, first heating means, first skimming means, and first means for separating water from soil;

second container provided with second means for inputting soil, second means for outputting soil, second means for inputting water, second means for outputting water, second means for outputting contaminant-detergent formations, second means of mixing and moving the soil from the second soil inputting means to the second soil outputting means, second heating means, second skimming means, and second means for separating water from soil;

third container provided with third means for inputting soil, third means for inputting water, and means for inputting a microorganism activating agent, third means for outputting soil, third means for outputting water, third means of mixing and moving soil from the third soil input means to the third soil output means, third heating means and third means for separating water from soil;

means for connecting the first soil output means with the second soil input means, the connecting means being provided with a fifth means of mixing and moving the soil from the first soil output means to the second soil input means;

means for connecting the second soil output means with the third soil input means, the connecting means provided with a sixth means of mixing and moving soil from the second soil output means to the third soil input means;

means for connecting the third water output means with the site of the contaminated water;

means for returning substantially contaminant free soil to the situs, the soil returning means being connected to the third soil output means;

at least one means for separating water from contaminants provided with water input and output means;

at least one means for filtering water provided with water input and output means;

means for connecting the output means of the at least one water/contaminant separation means with the input means of the at least one filtering means;

means for connecting the water output means of the first, second and third containers with the input means of the water/contaminant separation means;

means for connecting the output means of the at least one water filtering means with the water input means of the first, second and third containers for recirculating water; and means for circulating the water through the water connecting means, the at least one water/contaminant separation means, the at least one water filtering means and first, second and third containers.

14. The apparatus of claim 13, comprising the at least one filtering means comprises first, second and third series of filtering means;

the first series of filtering means being provided with water input and output means and a first water/contaminant separation means (A.P.I.$_1$), the first water/contaminant separation means being provided with water input and output means and connected to the input means of a first filtering means of the first series of filtering means, the output means of each of the filtering means of the first series being connected to the input means of the subsequent filtering means of the series and the output means of the last filtering means of the series being connected to the means for connecting the water output means of the filtering means to the first, second and third containers;

the second series of filtering means being provided with water input and output means and a second water/contaminant separation means (A.P.I.$_2$), the second water/contaminant separation means being provided with water input and output means and connected to the input means of a first filtering means of the second series of filtering means, the output means of each of the filtering means of the second series being connected to the input means of the subsequent filtering means of the series and the output means of the last filtering means of the series being connected to the means for connecting the water output means of the filtering means to the first, second and third containers; and the third series of filtering means being provided with water input and output means and a third water/contaminant separation means (A.P.I.$_3$), the third water/contaminant separation means being provided with water input and output means and connected to the input means of a first filtering means of the third series of filtering means, the output means of each of the filtering means of the third series being connected to the input means of the subsequent filtering means of the series and the output means of the last filtering means of the series being connected to the means for connecting the water output means of the filtering means to the first, second and third containers.

15. The apparatus of claim 13, wherein each of the first and second skimming means comprises froth flotation means.

16. The apparatus of claim 13, wherein the soil breaking means is regulatable so as to produce soil particles of a predetermined diameter.

* * * * *